(12) United States Patent
Holzapfel et al.

(10) Patent No.: US 9,361,781 B2
(45) Date of Patent: Jun. 7, 2016

(54) METHOD AND SYSTEM FOR DETECTING A STATE OF A GOLF CLUB

(71) Applicants: Anton J. Holzapfel, Waterloo, NE (US); Ken Knaub, Waterloo, NE (US)

(72) Inventors: Anton J. Holzapfel, Waterloo, NE (US); Ken Knaub, Waterloo, NE (US)

(*) Notice: Subject to any disclaimer, the term of this patent is extended or adjusted under 35 U.S.C. 154(b) by 0 days.

(21) Appl. No.: 14/216,447

(22) Filed: Mar. 17, 2014

(65) Prior Publication Data

US 2014/0313035 A1 Oct. 23, 2014

Related U.S. Application Data

(60) Provisional application No. 61/792,055, filed on Mar. 15, 2013.

(51) Int. Cl.
| | | |
|---|---|---|
| *G08B 13/14* | (2006.01) | |
| *G08B 21/24* | (2006.01) | |
| *G01S 5/02* | (2010.01) | |
| *G01S 11/06* | (2006.01) | |
| *G08B 21/02* | (2006.01) | |

(52) U.S. Cl.
CPC ............... *G08B 21/24* (2013.01); *G01S 5/0284* (2013.01); *G01S 11/06* (2013.01); *G08B 13/1427* (2013.01); *G08B 21/0266* (2013.01); *G08B 21/0294* (2013.01)

(58) Field of Classification Search
CPC .......................... A63B 2055/001; G08B 21/24
USPC .............. 340/568.6, 568.1, 571, 686.1, 686.6
See application file for complete search history.

(56) References Cited

U.S. PATENT DOCUMENTS

| | | | |
|---|---|---|---|
| 5,235,321 A | 8/1993 | Rowan et al. | |
| 5,434,789 A | 7/1995 | Fraker et al. | |
| 5,952,921 A * | 9/1999 | Donnelly ................... | 340/568.6 |
| 6,753,778 B2 | 6/2004 | Kruger | |
| 8,226,495 B2 | 7/2012 | Savarese et al. | |
| 8,581,727 B1 * | 11/2013 | Koenig et al. .............. | 340/568.6 |
| 2008/0218343 A1 | 9/2008 | Lee et al. | |
| 2009/0233735 A1 * | 9/2009 | Savarese et al. .............. | 473/407 |
| 2009/0321289 A1 | 12/2009 | Lasala | |
| 2010/0308105 A1 | 12/2010 | Savarese et al. | |
| 2012/0120573 A1 | 5/2012 | Bentley | |
| 2012/0249330 A1 | 10/2012 | Savarese et al. | |

FOREIGN PATENT DOCUMENTS

GB 2458347 A * 9/2009

* cited by examiner

*Primary Examiner* — Toan N Pham
(74) *Attorney, Agent, or Firm* — Suiter Swantz pc llo

(57) ABSTRACT

A method for detecting a lost club includes detecting an orientation characteristic of a golf club with a detection unit, transmitting the orientation characteristic from the detection unit to a mobile device, determining a distance between the golf club and the mobile device based on a signal transmitted from the detection unit to the mobile device and determining a lost club state based on the orientation characteristic of the golf club and the distance between the golf club and the mobile device.

28 Claims, 13 Drawing Sheets

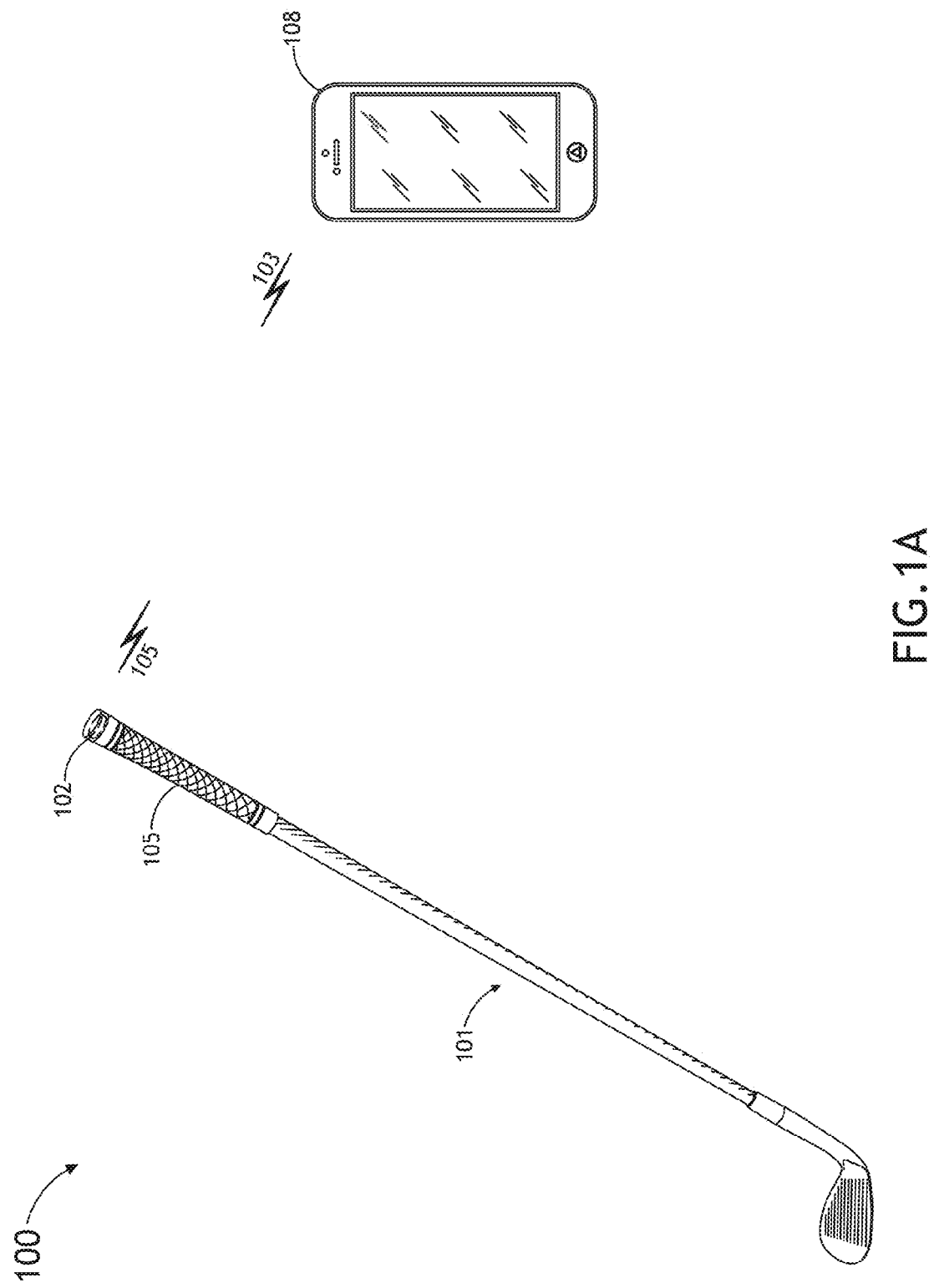

US 9,361,781 B2

METHOD AND SYSTEM FOR DETECTING A STATE OF A GOLF CLUB

CROSS REFERENCE TO RELATED APPLICATIONS

The present application claims the benefit under 35 U.S.C. §119 of U.S. Provisional Patent Application Ser. No. 61/792,055 filed Mar. 15, 2013. The U.S. Provisional Patent Application Ser. No. 61/792,055 filed Mar. 15, 2013 is hereby incorporated by reference in its entirety.

TECHNICAL FIELD

The present disclosure generally relates to the determining a state of a golf club, and more particularly to remotely determining a lost state of a golf club.

SUMMARY

Accordingly, the present disclosure is directed to a method for detecting a lost club. In one embodiment, the method includes detecting an orientation characteristic of a golf club with a detection unit; transmitting the orientation characteristic from the detection unit to a mobile device; determining a distance between the golf club and the mobile device based on a signal transmitted from the detection unit to the mobile device; and determining a lost club state based on the orientation characteristic of the golf club and the distance between the golf club and the mobile device.

In another embodiment, the method includes detecting an orientation characteristic of a golf club with a detection unit; transmitting the orientation characteristic from the detection unit to a mobile device; determining a last known distance between the golf club and the mobile device via a signal transmitted from the detection unit to the mobile device; determining a position of the mobile device via a satellite navigation signal at the time the detection unit and the mobile device stop communication; determining a distance between the golf club and the mobile device based on a combination of the last known distance between the golf club and the mobile device and the position of the mobile device at the time the detection unit and the mobile device stop communication; and determining a lost club state based on the orientation characteristic of the golf club and the distance between the golf club and the mobile device.

The present disclosure is further directed to a system for detecting a lost golf club. In one embodiment, the system includes a club configuration detection unit including at least one motion analyzer configured to detect one or more orientation characteristics of a golf club, wherein the club configuration detection unit is mechanically coupled to an end region of the golf club, wherein the club configuration detection unit includes communication module communicatively coupled to the club configuration detection unit and configured to transmit one or more detected orientation characteristics from the club configuration detection unit; one or more processors of a mobile communications device suitable for executing program instructions configured to receive the detected one or more orientation characteristics of the golf club transmitted by the communication module, the program instructions further configured to determine a lost golf club state based on the orientation characteristic of the golf club and the distance between the golf club and the mobile device; and a display unit communicatively couple to the one or more processors and configured to display the determined lost golf club state.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which:

FIG. 1A illustrates a high level schematic view of a system for detecting a lost golf club, in accordance with an embodiment of the present disclosure;

DETAILED DESCRIPTION

Figure 1B:
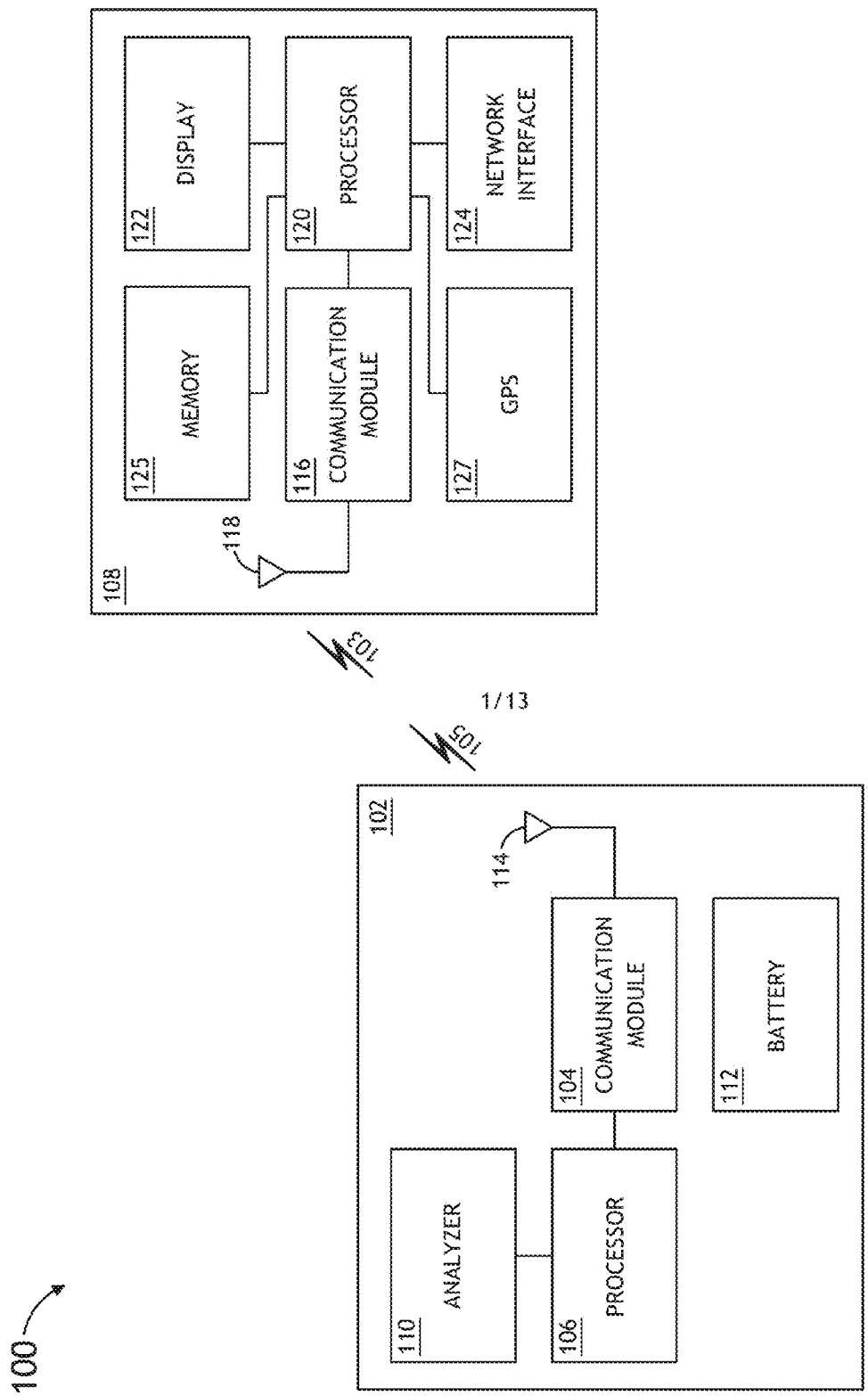
FIG. 1B illustrates a block diagram view of a system for detecting a lost golf club, in accordance with an embodiment of the present disclosure.

Reference will now be made in detail to the subject matter disclosed, which is illustrated in the accompanying drawings.

Referring generally to FIGS. 1A through 6C, a system and method for detecting a state of a golf club is described in accordance with the present invention. In one embodiment, the present invention is directed to methods and systems for detecting a static or dynamic state of a golf club. In one embodiment, the detection methods and systems of the present invention include, but are not limited to, the detection of a lost golf club 101.

FIG. 1A illustrates a high level schematic view of a system 100 for detecting one or more golf club states, in accordance with one or more embodiments of the present invention. In one embodiment, the system 100 includes a club configuration detection unit 102. In one embodiment, the club configuration detection unit 102 is operably coupled to a golf club 101 (e.g., coupled to handle 105 of club 101). In another embodiment, the detection unit 102 is configured to detect one or more static or dynamic states of the golf club 101. In one embodiment, the detection unit 102 is configured to detect one or more orientation characteristics of the golf club 101, such as, but not limited to, angle of the club with respect to ground, rotation of the golf club (i.e., swing speed). In another embodiment, the detection unit 102 is configured to detect one or more local translational characteristics of the golf club 101, such as, but not limited to, position of the golf club 101 and the translation motion of the golf club 101 based on the local motion of the detection unit 102.

In another embodiment, the club configuration detection unit 102 transmits one or more signals 105 to one or more remote wireless devices. In one embodiment, the one or more remote wireless devices include, but are not limited to, a mobile communications device 108. In one embodiment, the one or more mobile communications device 108 is configured to receive one or more signals 105 from the detection unit 102. In another embodiment, the mobile device communications device 108 is configured to transit one or more signals 103 (e.g., interrogation signals) to the detection unit 102.

In another embodiment, the detection unit 102 and the mobile communication device 108 are configured to determine a translational characteristic between the golf club 101 and the mobile communication device 108, such as, but not limited to, the relative position or translational speed between the golf club 101 (i.e., via detection unit 102) and the mobile communications device 108.

FIG. 1B illustrates a block diagram view of the system 100, in accordance with one or more embodiments of the present invention. In one embodiment, the configuration detection unit 102 includes a communication module 104, one or more processors or processing elements 106, one or more motion analyzers 110, one or more batteries 112 and an antenna 114. It is recognized herein that the club configuration detection unit 102 is not limited to the elements and components listed herein, which are listed for illustrative purpose. It is further recognized herein that the club configuration detection unit 102 may include additional components not depicted in FIG. 1B, such as, but not limited to, memory, interface ports (e.g., data ports, recharging ports and the like), additional processors, additional motional analyzers, additional communication components (e.g., WiFi module, Near Field Communication module, RFID devices and the like).

In another embodiment, the mobile device 108 may include, but is not limited to, a communications module 116, an antenna 118, one or more processors 120, a display 122, a network interface 124, memory 125 and a GPS unit 127 (or other satellite based positioning chip). It is further recognized herein that the mobile device 108 may include additional components not depicted in FIG. 1B, such as, but not limited to, interface ports (e.g., data ports, recharging ports and the like), additional processors, additional motional analyzers, additional communication components (e.g., WiFi module, Near Field Communication module, RFID devices and the like). The mobile device 108 may include any wireless mobile communications device known in the art. For example, the mobile device 108 may include any one of a cellphone, a smartphone (e.g., IPHONE, ANDROID enabled smartphone, or the like), a personal digital assistant (PDA), a tablet device (e.g., IPAD, ANDROID enabled tablet device, or the like), a tablet PC, a laptop, a smart book, an ultra-book, or the like The one or more motion analyzers 110 of detection unit 102 may include any motion analyzer known in the art. In one embodiment, the one or more motion analyzers 110 include one or more accelerometers. For example, the one or more motion analyzers 110 of detection unit 102 may include any accelerometer known in the art suitable for use in a compact digital device. For instance, the one or more motion analyzers 110 may include, but are not limited to a 6-axis accelerometer and compass (e.g., 6D orientation detection accelerometer). In another instance, the one or more motion analyzers 110 may include, but are not limited to a 3-axis accelerometer. In one embodiment, the analyzer 110 of the detection unit 102 includes an accelerometer and/or compass suitable for detecting one or more orientation characteristics of the golf club 101, such as, but not limited to, angle of the club with respect to ground or rotational speed of the golf club (i.e., swing speed). In one embodiment, the analyzer 110 of the detection unit 102 includes an accelerometer and/or compass suitable for detecting one or more local translational characteristics of the golf club 101, such as, but not limited to, local position of the club or local translational motion of the of the club.

In one embodiment, the one or more analyzers 110 are communicatively coupled to one or more processors (or processing elements) 106. In this regard, upon measuring an orientation or translational characteristic of the golf club 101, such as the angle of the golf club, one or more processors 106 may retrieve the motion analyzer data from the analyzer 110.

For the purposes of the present disclosure, the term "processor" or "processing element" may be broadly defined to encompass any device having one or more processing or logic elements, which execute program instructions (e.g., program instructions stored in memory). In this sense, the one or more processors 106 may include any microprocessor-type device or logic elements configured to execute software algorithms and/or program instructions. In one embodiment, the one or more processors 106 of the detection unit 102 and one or more processors 120 the mobile device 108 may include a mobile computing system configured to execute a set of program instructions configured to operate the system 100, as described throughout the present disclosure. It should be recognized that the steps described throughout the present disclosure may be carried out by a single computing system or, alternatively, multiple computing systems. Moreover, different subsystems of the system 100, such as the devices 104, 110, 116, 120, 122 and 124 of system 100, may include a processor or logic elements suitable for carrying out at least a portion of the steps described in the present disclosure. Therefore, the above description should not be interpreted as a limitation on the present invention but merely an illustration.

In one embodiment, the one or more processors 106 of the detection unit 102 may include, but is not limited to, a system-on-chip (SOC). For example, the one or more processors 106 may include, but are not limited to, a system-on-chip (SOC) platform (e.g., Texas Instruments CC2540), which may be configured to run both the analyzer application and the communications protocol (e.g., Bluetooth low energy protocol) stack. It is noted herein that the present invention is not limited to such a processor platform and the example provided above is provided merely for illustrative purposes.

In another embodiment, the one or more processors 106 are communicatively coupled to one or more communication modules 104. In this regard, the one or more processors 106 one or more processors 106 may relay the motion analyzer data to the communications module 104. The communications module 104 (and 116 of the mobile device 108) may include any wireless communications module or device known in the art suitable for transmitting one or more signals from the detection unit 102 to the mobile device 108. For example, the communications module may include, but is not limited to, a radio-frequency based communications module. For instance, the communications module may include, but is not limited to, a BLUETOOTH module. For example, the communication module may include, but is not limited to, a BLUETOOTH 4.0 Low Energy (BLE) Single/Duel Mode Radio Chip. By way of another example, the communication module may include, but is not limited to, a BLUETOOTH 2.1 chip. By way of another example, the communication module may include, but is not limited to, a BLUETOOTH 2.1 EDR chip. By way of another example, the communication module may include, but is not limited to, one or more RFID units. By way of another example, the communication module may include, but is not limited to, one or more Near Field Communication (NFC) devices. It is noted herein that the examples of communication modules provided above are not limiting and should merely be interpreted as illustrative.

In another embodiment, the communication module 104 is communicatively coupled to one or more antenna 114. In another embodiment, the antenna 114 is configured to transmit one or more signals 105 (e.g., RF signals) encoded with the measurement data from the one or more motion analyzers 110 to the mobile device 108. In another embodiment, the antenna 114 is configured to receive one or more signals 103 (e.g., RF signals) encoded with instruction data (e.g., interrogation request) from the mobile device 108. In another embodiment, the communication module 116 is communicatively coupled to one or more antenna 118 of the mobile device 108.

In another embodiment, the detection unit 102 includes one or more batteries 122 configured to power the various components (e.g., analyzer 110, processor 106, communication module 10 and the like). In a general sense, the battery 112 may include any battery capable of powering a small solid state device. For example, the battery 112 may include, but is not limited to, a 3 volt lithium battery. In another embodiment, the battery 112 is rechargeable. For instance, the detection unit 102 may include, but is not required to include, a recharging port, allowing a user to electrically charge the battery 112. In another instance, the detection unit 102 may include, but is not required to include, induction circuitry, allowing a user to remotely electrically charge via external induction circuitry. In another instance, the battery 112 may be user-replaceable.

In one embodiment, the mobile device 108 may include may include any audio display device and/or visual display device known in the art. The visual display device may include any suitable visual display device known in the art, such as, but not limited to, a LCD, an LED display, an OLED display, a plasma display or a CRT display. In this regard, the one or more display devices may be configured to utilize text-based messages, symbols, indicia, or other identifiable visual characters, or symbols. The audio display device may include any suitable audio display device known in the art, such as one or more audio speakers.

In another embodiment, the mobile device 108 may include a network interface 124 for placing the one or more processors 120 in communication with a network. The network interface device described herein may include any network interface device known in the art. For instance, the network interface devices may include a wireless-based interface device employing GSM, GPRS, CDMA, EV-DO, EDGE, WiMAX, LTE, Wi-fi protocols, and the like. Alternatively, in the case of a non-mobile fixed device, discussed in more detail further herein, the network interface devices may include wireline-based interface devices (e.g., DSL-based interconnection, Cable-based interconnection, T9-based interconnection, and the like). In another embodiment, the mobile device 108 may include memory 125. It is recognized herein that the memory 125 may include any memory known in the art suitable for implementation in a mobile wireless device.

Figure 1C:
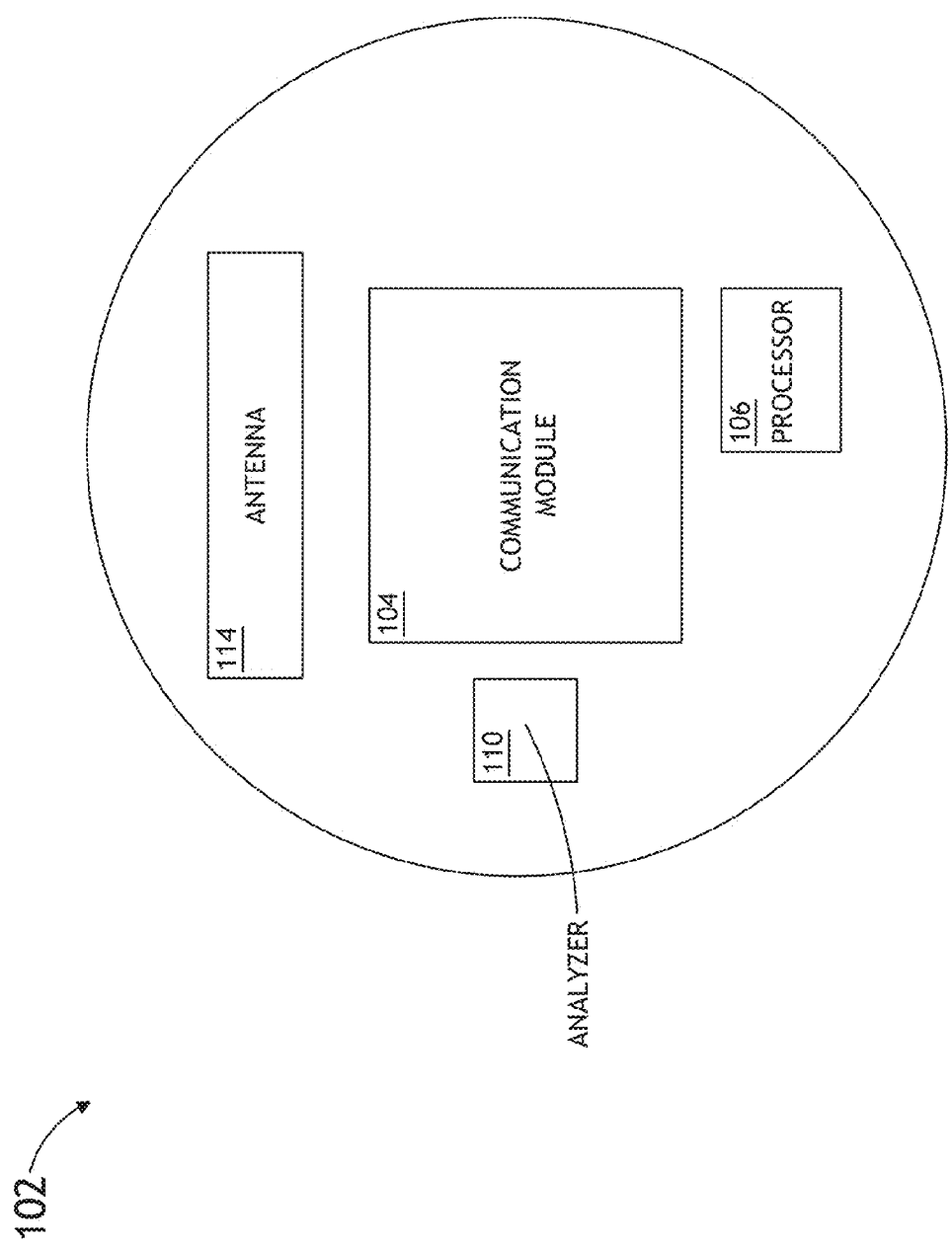
FIG. 1C illustrates a high level schematic view of a system for detecting a lost golf club, in accordance with an embodiment of the present disclosure.
Figure 1D:
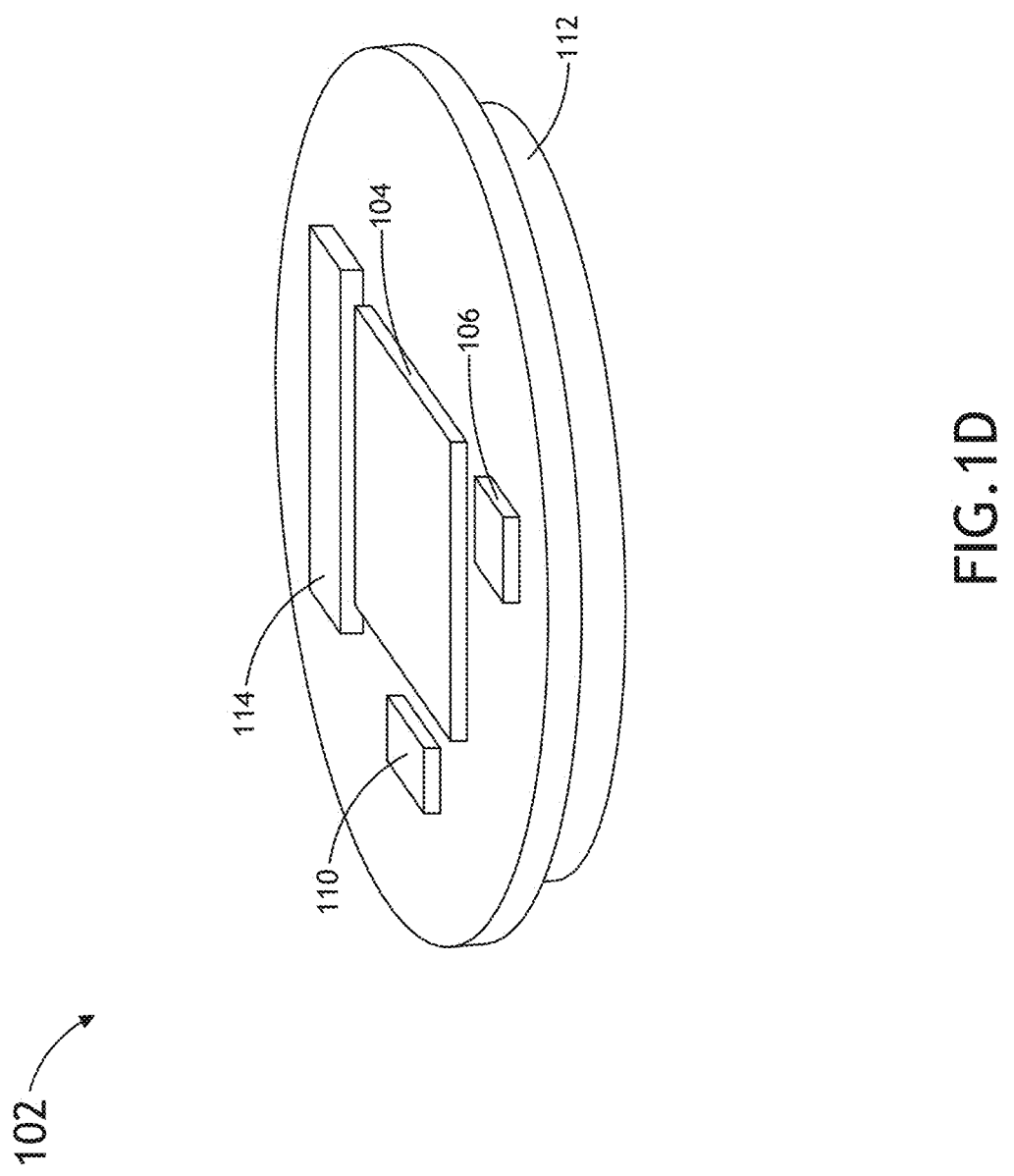
FIG. 1D illustrates a high level schematic view of a system for detecting a lost golf club, in accordance with an embodiment of the present disclosure.

FIGS. 1C and 1D illustrate simplified schematic views of the layout of the detection unit 102, in accordance with one or more embodiments of the present invention. In one embodiment, the processor 106, the analyzer 110 and the communications module 104 may be positioned in a coplanar fashion, as depicted in FIGS. 1C and 1D. In another embodiment, the battery holder 113 for holding battery 112 may be positioned on a plane different than the processor 106, the analyzer 110 and the communications module 104, as shown in FIG. 1D. It is noted herein that the specific layout provided in FIGS. 1C and 1D are provided merely for illustrative purposes and should not be interpreted as limiting.

Figure 2:
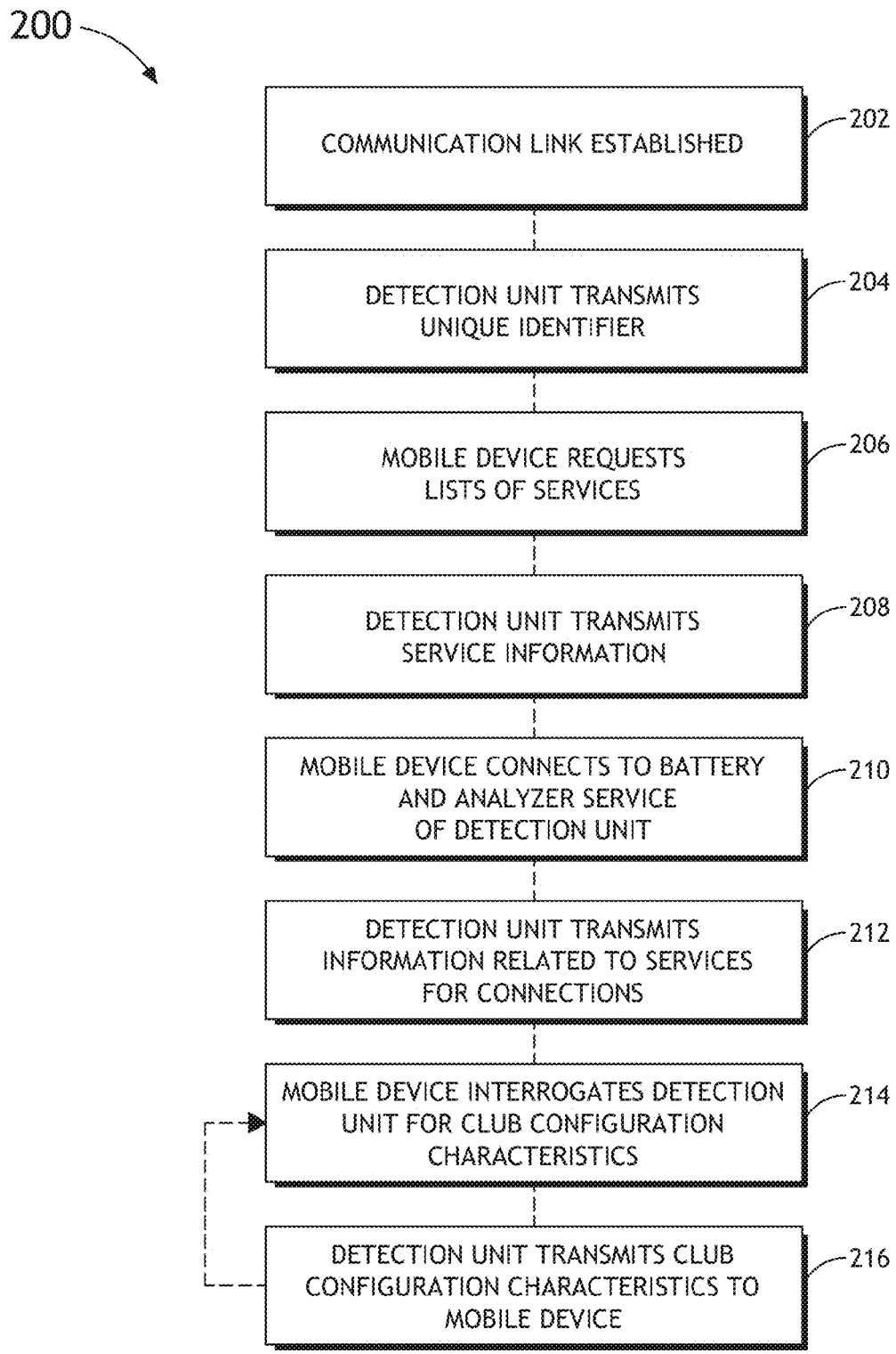
FIG. 2 illustrates a process flow diagram depicting a method for communicating between a detection unit and mobile device, in accordance with an embodiment of the present disclosure.

FIG. 2 illustrates a process flow diagram 200 depicting the steps of a communications process between the detection unit 102 and the mobile device 108, in accordance with one or more embodiments of the present invention. In step 202, a communication link is established between the detection unit 102 and the mobile device 108. For example, a software application running on the mobile device 108 begin 'listening' for a club state determination (e.g., carried on signal 105) from detection unit 102. Further, the communication module 104 of the detection unit 102 may broadcast a 'connection availability' indicator to the mobile device 108. In turn, the application running on the mobile device 108 may connect the mobile device 108 to the communications module 104.

In step 204, the communication module 104 of the detection unit 102 transmits a unique identifier. For example, each detection unit 102 may be encoded with a unique identifier so that an interrogating mobile device 108 may differentiate between detection units 102 and their corresponding clubs 101. For instance, the use of unique identifiers may aid in allowing a single user to monitor multiple golf clubs with a single mobile device. In another instance, the use of unique identifiers may aid in allowing two or more users to monitor their golf clubs without confusion from other detection units in the area.

In step 206, the mobile device 108 requests a list of services supported by the communications module 104. In step 208, the communications module 104 of the detection unit transmits the list of services information to the mobile device 108.

In step 210, the mobile device 108 connects to the battery and analyzer services of the detection unit 102 via communications module 104. In step 212, the detection unit 102 transmits information related to services of the detection unit 102 available for connection.

In step 214, the mobile device 108 interrogates the communication module 104 of the detection unit 102 for club configuration characteristics. In one embodiment, an application running on the mobile device 108 may interrogate the communication module 104 of the detection unit 102 at a selected rate for one or more configuration characteristics. For example, the one or more configuration characteristics may include signal strength, battery level, position information (e.g., x, y, z positions), club orientation information and the like.

In step 216, the communication module 104 of the detection unit transmits club configuration characteristics to the mobile device 108. In one embodiment, Cartesian coordinate data may be transmitted from the detection unit 102 to the mobile device 108, whereby a software application running on the mobile device converts the x, y, z positional data of the analyzer 110 to angular/orientation data associated with the club 101. In another embodiment, the conversion from x, y, z position data may take place on the detection unit 102, whereby the communication module 104 then transmits the orientation characteristic to the mobile device 108. As discussed in greater detail further herein, the spatial information of the analyzer may be used to determine orientation/angular information associated with the club, which, in turn, may be used an indicator of a 'lost club state.'

Figure 3:
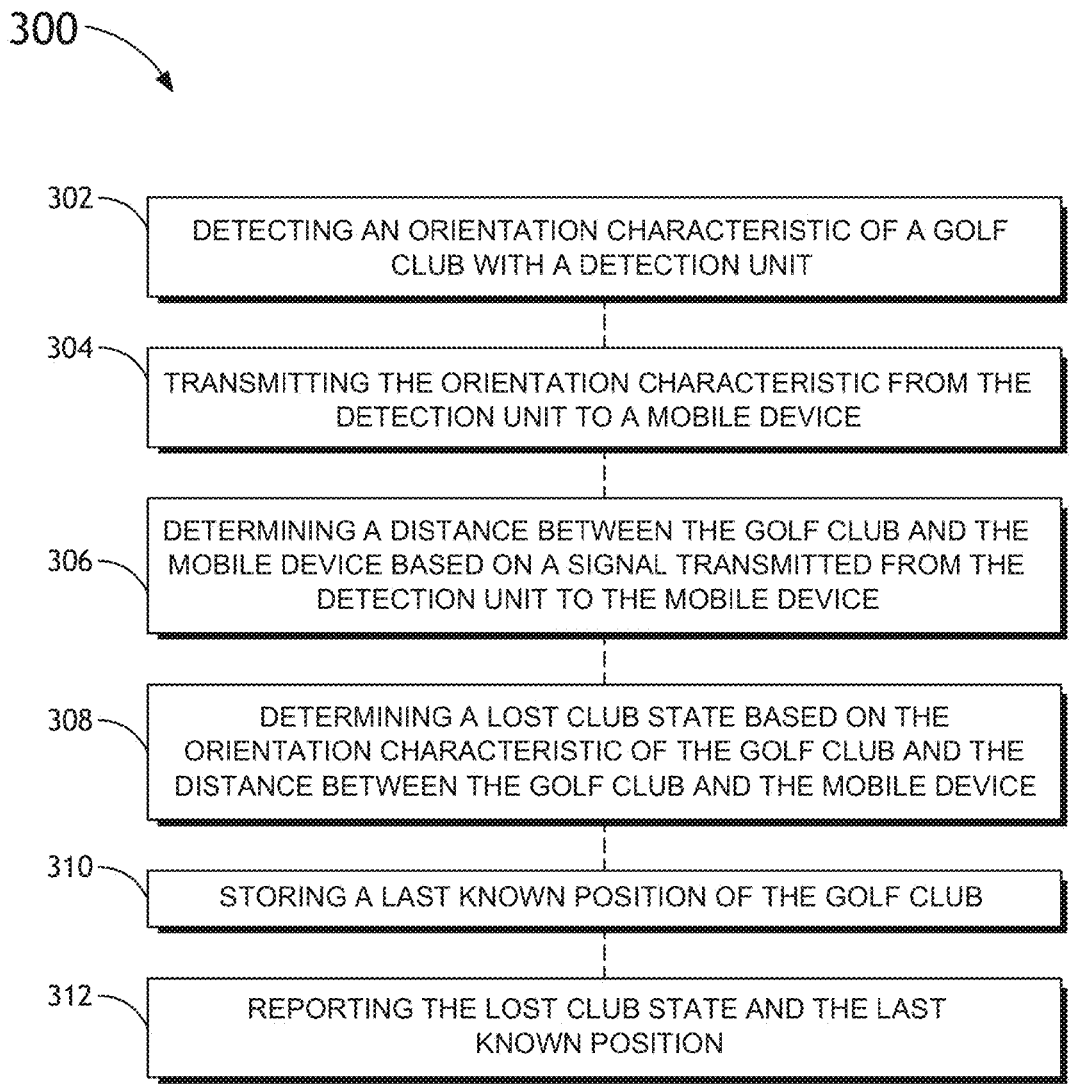
FIG. 3 illustrates a process flow diagram depicting a method for detecting a lost golf club, in accordance with an embodiment of the present disclosure.

FIG. 3 illustrates a process flow diagram 300 depicting a method for detecting a state of a golf club 101, in accordance with one embodiment of the present invention. It is noted herein that the process 300 may be implemented by various embodiments of system 100 of the present invention. It is further recognized, however, that process 300 is not limited to the architecture of system 100. In step 302, an orientation characteristic of a golf club is detected with detection unit 102. For example, the analyzer 110 detects an orientation characteristic (e.g., via measurement of x, y, z positional information of analyzer) of the golf club. For example, the analyzer 110 may detect an angle of orientation of the golf club 101 with respect to the ground. For instance, the analyzer may include, but is not limited to, a 6D accelerometer and compass (e.g., 3-axis accelerometer with 3-axis magnetic sensor) for detecting absolute position and relative position changes.

In step 304, the orientation characteristic is transmitted from the detection unit 102 to a mobile device 108. For example, the communication module 104 (e.g., low energy BLUETOOTH module) may transmit the measured orientation characteristics of the golf club 101 to the mobile device 108. For instance, method 300 may utilize, but is not required to utilize, a communication process similar to that depicted in process 200 to transmit orientation information to the mobile device 108.

In step 306, a distance between the golf club 101 and the mobile device 108 is determined based on a signal transmitted from the detection unit 102 to the mobile device 108. For example, a distance between the mobile device 108 and the detection unit 102 may be calculated utilizing the signal strength of the signal 105 transmitted from the communication module (e.g., low energy BLUETOOTH module) 104 to the mobile device 108. It is noted herein that various distance calculation algorithms may be utilized to determine or at least estimate the distance based on signal strength. For example, the distance may be calculated (in meters) using the following formula:

$$RSSI\ [dbm] = -(10n\ LOG\ 10(d) - A) \qquad (Eq.\ 1)$$

Where RSSI represents the signal strength, d represents the distance between the communications module 104 (and, therefore, the detection unit 102) and the mobile device 108, A represents the path loss coefficient, and n represents a reference signal, which may be determined via calibration. For instance, in some cases, A=−55 and n=3.

In step 308, a lost club state may be determined based on the orientation characteristic of the golf club and the distance between the golf club and the mobile device. For example, a lost club state may be determined by comparing the detected one or more orientation characteristics (e.g., angle, position, and etc.) of the golf club to a selected orientation threshold (e.g., selected angle threshold) and the distance between the golf club and the mobile device to a selected distance threshold. In one embodiment, the application running on the device 108 may determine a golf club lost state (e.g., whether club is lost or not lost) by comparing the detected one or more orientation characteristics of the golf club to a selected threshold and the distance between the golf club and the mobile device to a selected distance threshold. For instance, the orientation threshold and the distance threshold may include preset data that define angles that club is considered "laying down" and distance from mobile device 108 that club is deemed "lost." In another embodiment, the application running on the device 108 may determine a golf club lost state by comparing the detected one or more orientation characteristics of the golf club and the distance between the golf club and the mobile device to one or more stored configuration profiles. For instance, the configuration profiles may include a sliding scale, which define a lost state as two-variable function of club orientation characteristics and distance from the mobile device.

In a further step 310, the last known position of the golf club 101 is stored. For example, the one or more processors 120 of device 108 may store the last known position in memory 125 for future retrieval. For example, the last known position, based on satellite navigation data (e.g., GPS 127), may be stored in memory 125. In turn, the last known position data of the detection unit 102 (i.e., the last known position of mobile device 108 at last data receipt from detection unit 102) may be stored for future use.

Figure 4A:
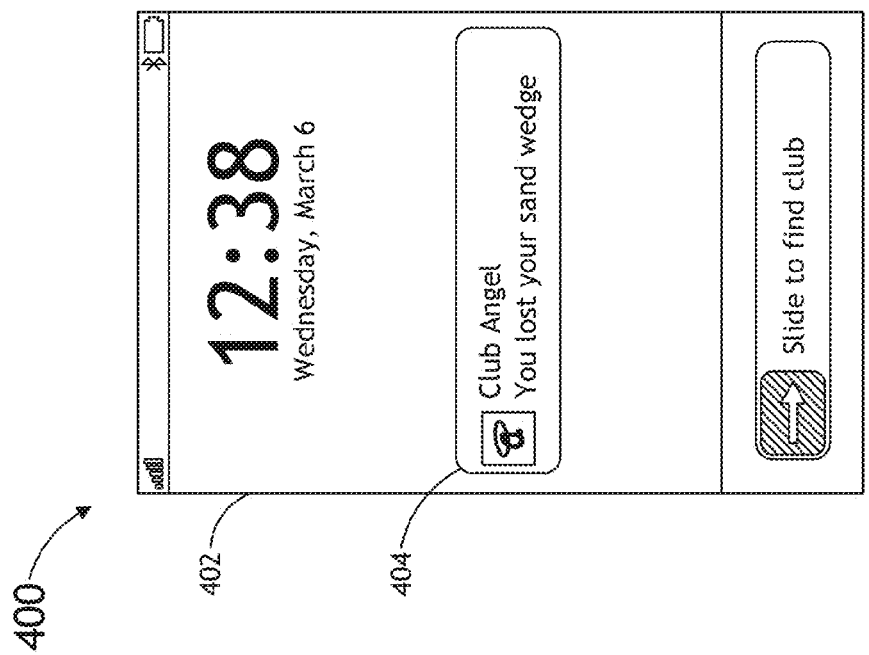
FIGS. 4A-4C illustrates conceptual views of displays of a system for detecting a lost golf club, in accordance with an embodiment of the present disclosure.
Figure 4C:
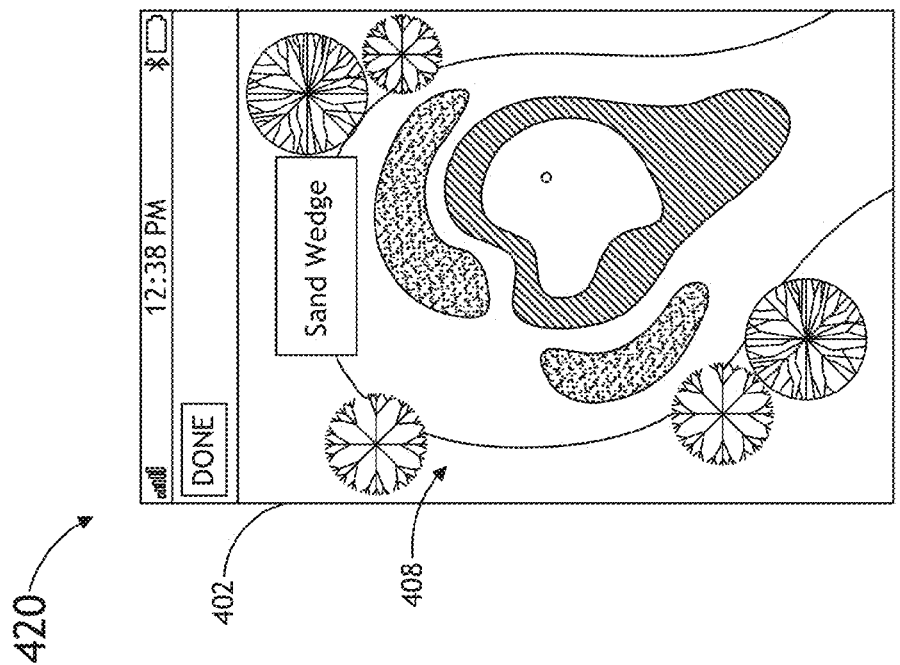
Figure 4B:
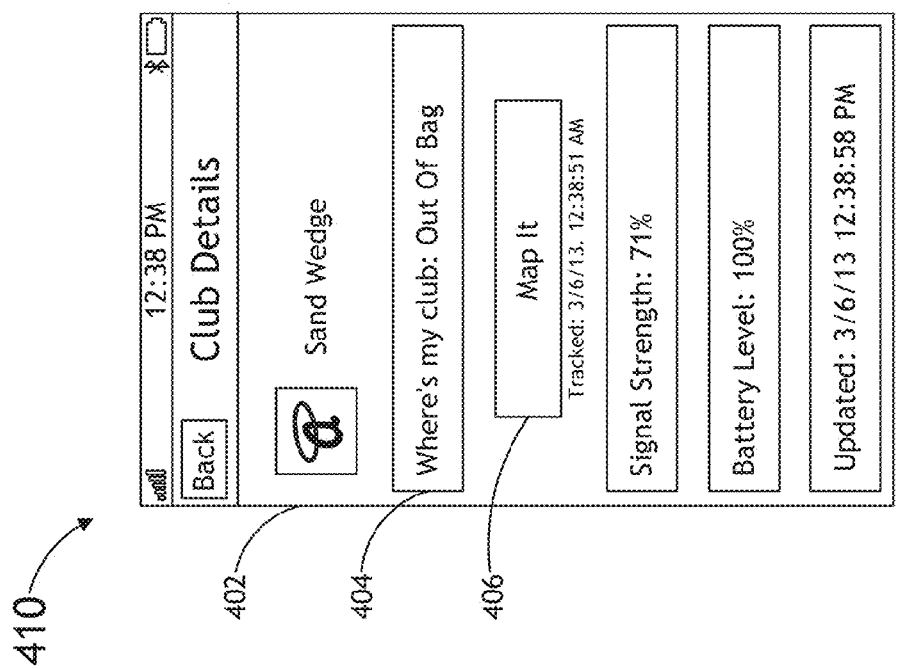

In a further step 312, the lost club state and the last known position may be reported. For example, the lost club state may be reported to a display 122 of the mobile device. The display 122 may include any audio and/or visual display known in the art. By way of another example, the lost club state may be reported to a display 122 of the mobile device. The display 122 may include any audio and/or visual display known in the art. For example, as shown in FIG. 4A, a lost club alert 404 may be displayed to the visual display 402 of the mobile device 108. In another embodiment, the system 100 may report the status 404 of the club 101 to display 402, as shown in FIG. 4B. In turn, the user may input a mapping request 406 that when selected directs the application running on the processor 120 to display a map 408 of the last known position of the club 101, as shown in FIG. 4C.

In another embodiment, the lost club state and the last known position may be reported to a remote server. For example, the lost club state and the last known position may be reported to a remote server (e.g., remote server accessible via clubhouse service or user's email client) via a network using network interface 124. In another embodiment, the lost club state and the last known position may be reported to an additional mobile device (e.g., partner's mobile device).

In an alternative embodiment, the detection unit 102 may act to transmit characteristics associated with the club (e.g., position, club handle orientation, and the like) to a fixed wireless network (instead of a mobile device 108). The fixed network may then relay information gathered from the detection unit 102 to a remote service (e.g., software on remote server). This information may then be accesses remotely by various users in real time or delayed time.

Figure 5A:
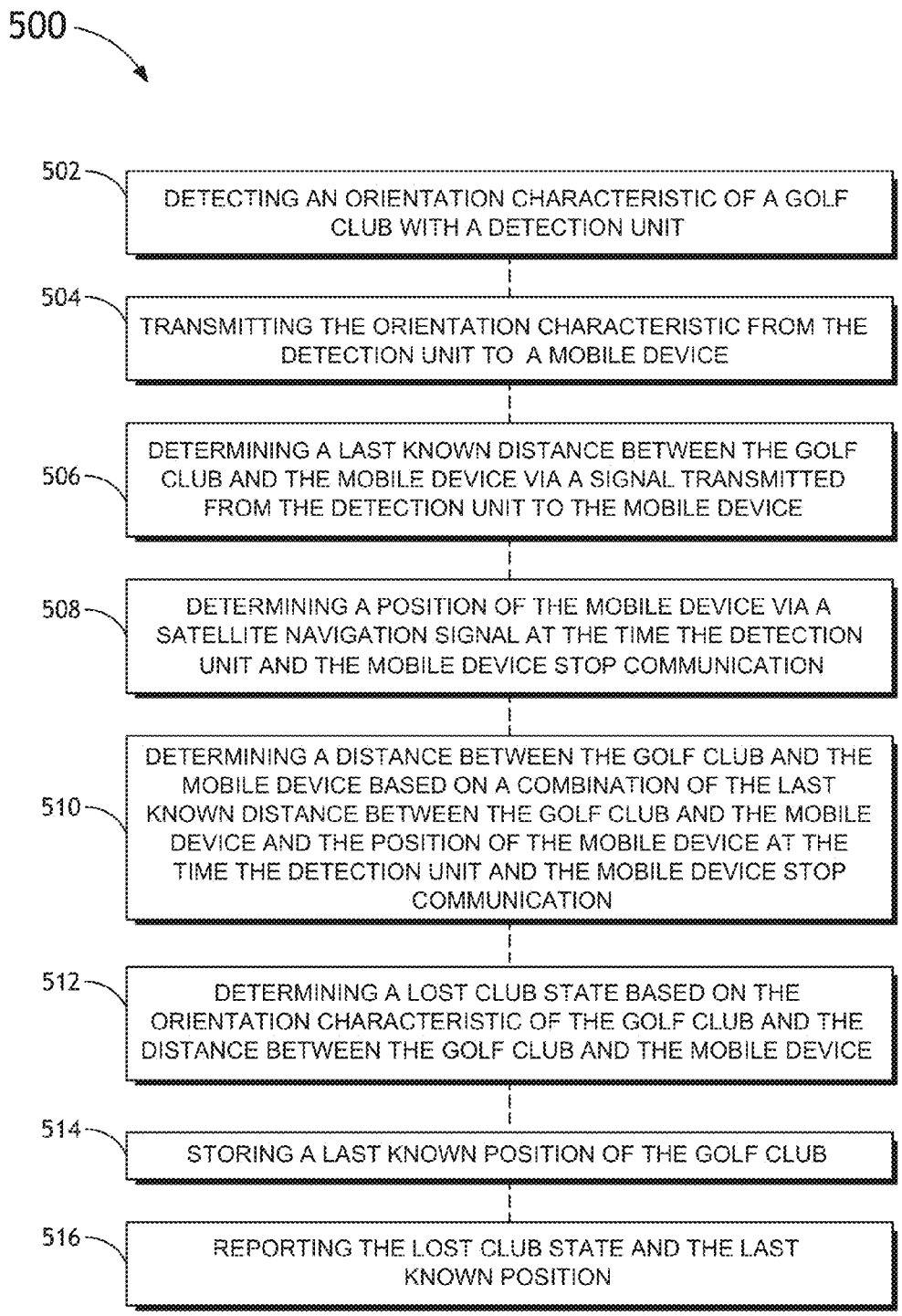
FIG. 5A illustrates a process flow diagram depicting a method for detecting a lost golf club, in accordance with an embodiment of the present disclosure.

FIG. 5A illustrates a process flow diagram 500 depicting a method for detecting a state of a golf club 101, in accordance with one embodiment of the present invention. It is noted herein that FIG. 5A may be applicable in settings wherein the mobile device 108 and the detection unit 102 become positioned out of signal range of each other via the communication modules 104, 116. It is noted herein that the process 500 may be implemented by various embodiments of system 100 of the present invention. It is further recognized, however, that process 500 is not limited to the architecture of system 100. Further, it is recognized herein that the embodiments and examples described with respect to process flow 300 should be interpreted to extend to process flow 500.

In a first step 502, an orientation characteristic of a golf club is detected with a detection unit 102. In a second step 504, the orientation characteristic from the detection unit 102 is transmitted to a mobile device 108.

In step 506, a last known distance between the golf club and the mobile device is determined via a signal transmitted from the detection unit to the mobile device. In one embodiment, the one or more processors 120 of device 108 may store the last known distance between the detection unit 102 and the mobile device 108. For example, the one or more processors 120 may continuously (or at selected intervals) store the distance between the detection unit 102 and the mobile device 108 calculated based on the signal strength from the communications (e.g., calculate with Eq. 1 and the like).

Figure 5B:
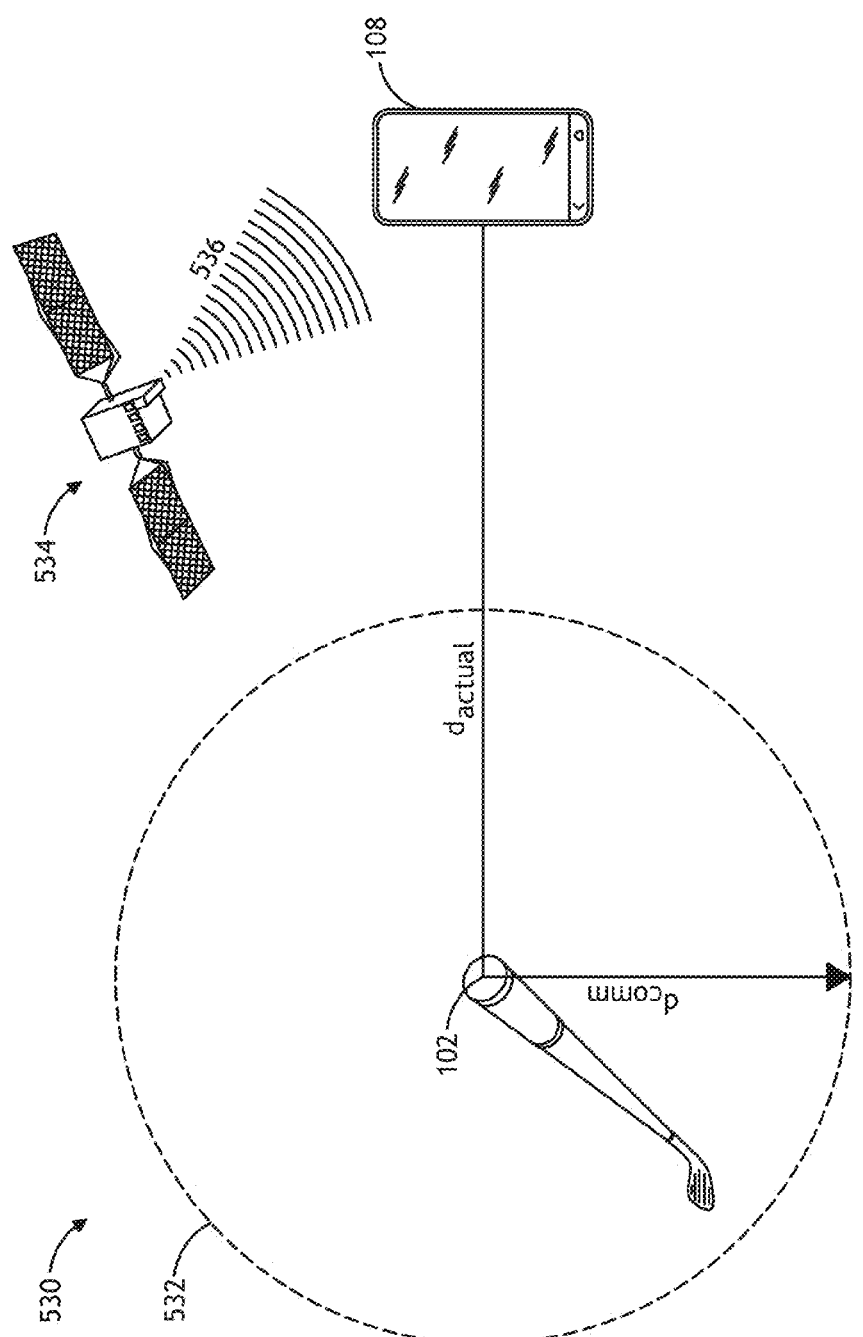
FIG. 5B illustrates a high level schematic view of a system for detecting a lost golf club, in accordance with an embodiment of the present disclosure.

In step 508, a position of the mobile device is determined via a satellite navigation signal at the time the detection unit and the mobile device stop communication. In step 510, a distance between the golf club and the mobile device is determined based on a combination of the last known distance between the golf club and the mobile device and the position of the mobile device at the time communication between the detection unit and the mobile device stopped. It is noted herein that beginning GPS (or other satellite-based position detection systems) at the moment the detection unit 102 and mobile device 108 lose contact allows the system 100 to extend service to a user to distances beyond the range of the communication device 104. For example, as shown in FIG. 5B, circle 532 represents a conceptual depiction of the maximum range of the detection unit 102, characterized by the communication distance, d-comm. At distances beyond this threshold, where the actual distance, d-actual, between the detection unit 102 and the mobile device 108 is greater than d-comm, the mobile device may utilize satellite navigation data 536 from a satellite navigation system 534 (e.g., GPS, GNOSS and the like) to continue tracking the real position of the mobile device 108. This real position measured via GPS may then be combined with the last known distance measured via RF signal to form to estimate the distance from the mobile device to the detection unit 102.

In alternative embodiments, GPS-based data may also be used concurrently with distance measurements between the detection unit 102 and the mobile device 108 (even when not out of range) in order to supplement the RF-based distance calculations. In one embodiment, when the detection unit 102 is on it may actively transmit data and signals of different strength to the mobile device 108. As the mobile device 108 tracks the club it may store GPS coordinates corresponding with each of the given signal strengths at the time. In another embodiment, this allows the system 100 to more accurately track club location given an N number of points for signal strength. In this regard, a closer (stronger) signal results in a more accurate reading in terms of where the club is located than a weaker signal. Stringing the points together across the signal strength span allows the system 100 to create an accurate mapping of where the club is located. In another embodiment, when the club is in lost mode, the system 100 may then use the stored data and the current position of the mobile device 108 to track back to the last known location of the club 101 using the combination of the stored club coordinates and the coordinates of the mobile device 108.

In step 512, a lost club state may be determined based on the orientation characteristic of the golf club and the distance between the golf club and the mobile device. In a further step 514, the last known position of the golf club 101 is stored. In a further step 516, the lost club state and the last known position may be reported.

Figure 6A:
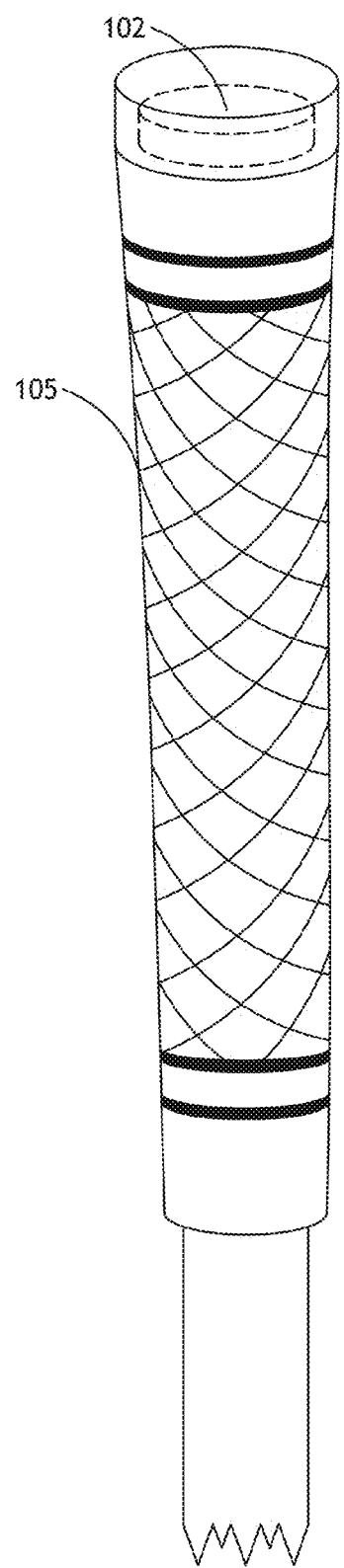
FIG. 6A illustrates a schematic view of a detection unit disposed in a golf club handle, in accordance with an embodiment of the present disclosure.
Figure 6B:
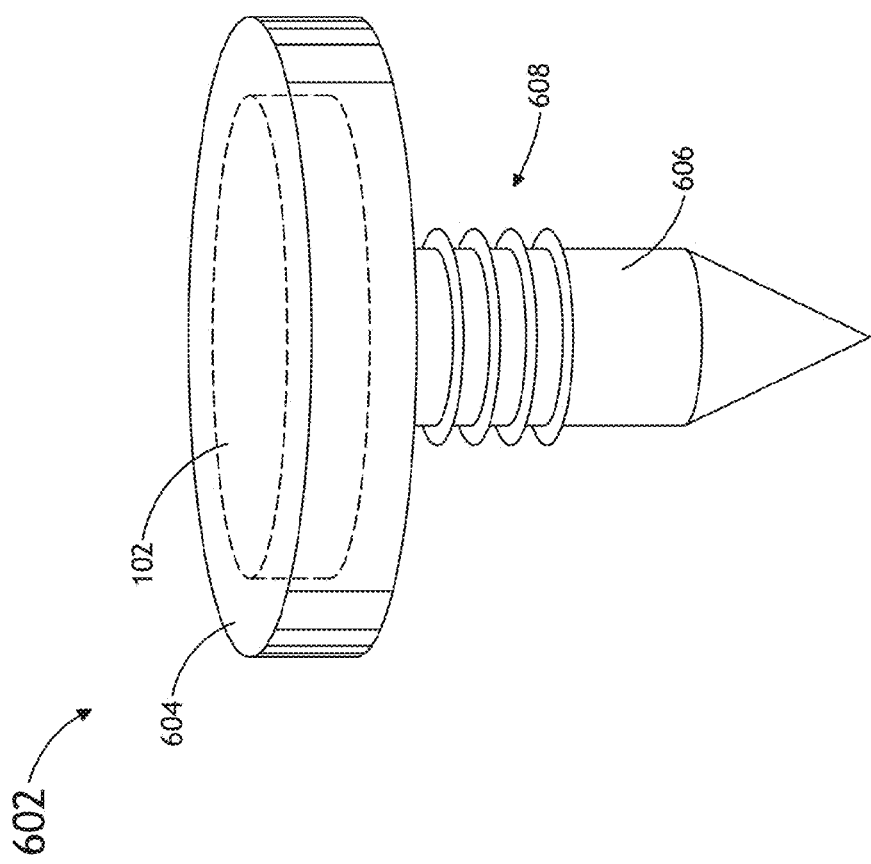
FIG. 6B illustrates a schematic view of a stopper unit for disposing a detection unit in a golf club handle, in accordance with an embodiment of the present disclosure.
Figure 6C:
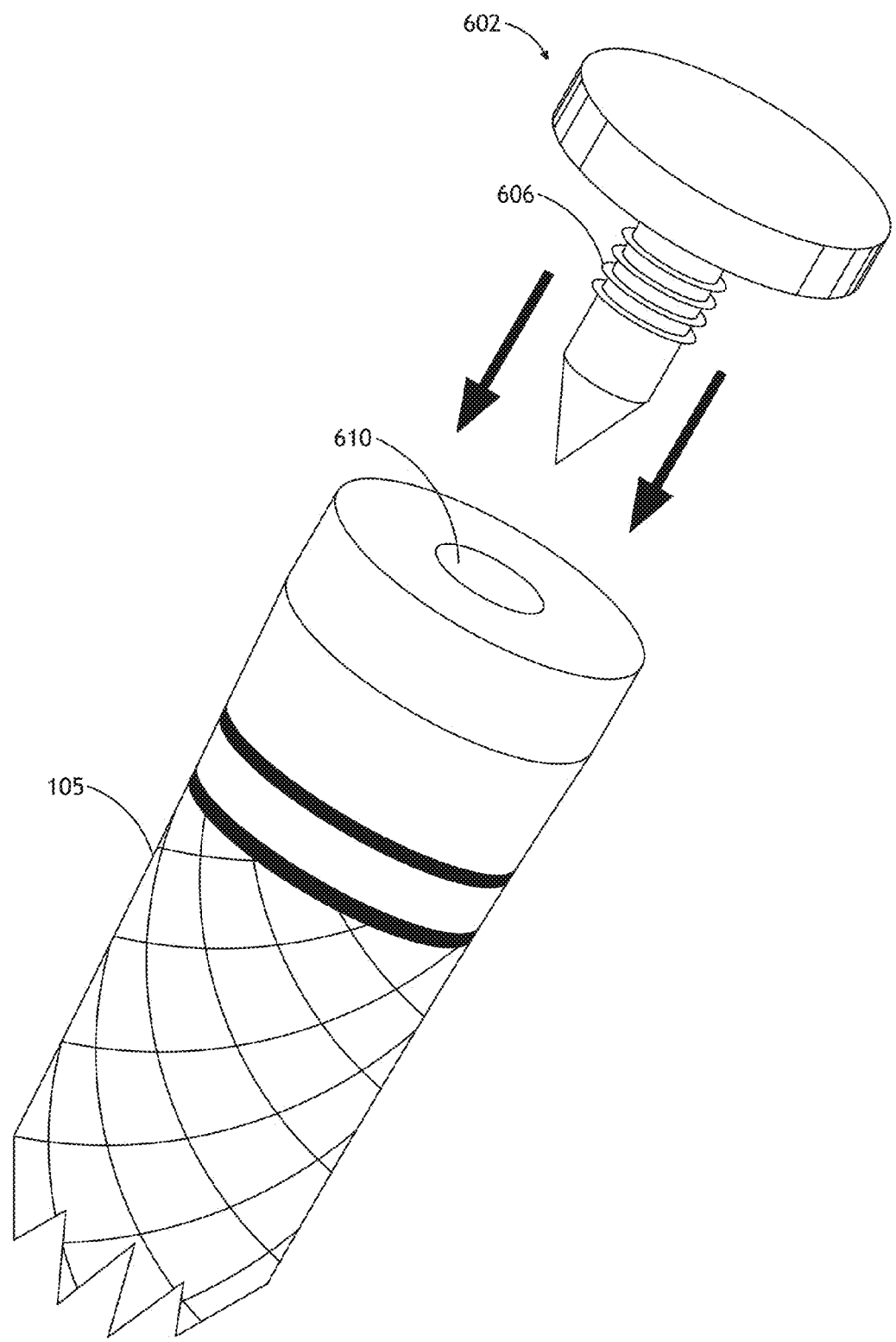
FIG. 6C illustrates a schematic view of a stopper unit for disposing a detection unit in a golf club handle, in accordance with an embodiment of the present disclosure

FIG. 6A depicts a schematic view of the detection unit 102 disposed in the handle/grip region 105 of a golf club 101. The detection unit 102 may be mechanically coupled to the golf club 101 in any manner known in the art. For example, as shown in FIG. 6A, the detection unit 102 may be built into the grip of the club handle 105. In another embodiment, the detection unit 102 may be built into grips used to re-grips pre-existing golf clubs. In another embodiment, shown in FIGS. 6B and 6C, the detection unit 102 may be built into a stand-alone unit. For example, the stand-alone unit may include a stopper device 602 constructed to such that it may be forcibly pressed into the end portion of the grip region 105 of a golf club 101, as shown in FIG. 6C. For instance, the stopper device 602 may include, but is not limited to, a head region 604 for encasing the detection unit 102 and a shaft portion 606 for being pressed into the end portion 610 of the grip region 105 of the club. In another embodiment, the shaft portion 606 may include, but is not limited to, a set of threads or protrusions for enhancing mechanical coupling between the stopper 602 and the end region of the grip region 105.

In one embodiment, the system 100 is designed to recognize when a golf club is in a known location, the golfer's bag, for example, and when the golf club is lost, or out of the golfer's bag. When the mobile device 108 can no longer communicate with the detection unit 102 of the club 101 (that is out of the golfer's bag) it will alert the golfer that the club has either been forgotten or is now lost. Once a golfer has been notified of a tracked club identified as out of the golf bag, the mobile device 108 will recall the club's last known location based upon latitude and longitude of the club 101. In another embodiment, as directed through action by the golfer, the mobile device 108 may then plot that location within a mapping application also running on the user's mobile device, relative to the golfer's location. In another embodiment, when the mobile device can no longer communicate with a club that is in a golfer's bag (i.e., orientation of golf club is consistent with clubs stored in golf bag) it does not alert the golfer as this is viewed as a safe zone for the golf club. In another embodiment, the application can simultaneously communicate with two or more detection units 102. In another embodiment, the mobile device 108 may recognize each detection unit 102 (one unit 102 on a single club of a set of clubs) uniquely when the club is close to the device and allows the golfer to select and name each club for individual tracking.

In one embodiment, the system 100 uses the GPS/Location services and date/time of the smart phone to track a golfer's clubs. When the detection unit 102 is connected to the club it may record the location of the club within a few meters along with the date and time the location was recorded. If the golfer moves more than 3 meters the system 100 may record the new location of the club along with the date and time of the new location.

In another embodiment, when a club is lost, the golfer can then use this information to track where they last left the club. The mobile device may map this information on the display, showing the golfer the last date and time of the location of the club and the known latitude and longitude of the club within a few yards. In another embodiment, the location of the golfer may be plotted in relation to the club and a line showing the path to the club may be displayed. In another embodiment, the system 100 may also superimpose a light gray (or other color) radius around the club that signifies the range of the club signal, which allows the golfer to visualize when they should be able to establish contact with the club again. In another embodiment, a slight darker and smaller radius around the club inside the signal circle signifying the last known location of the club within a few meters may be displayed. In another embodiment, as the golfer gets closer to the club a signal indicator on the map will indicate if the golfer is getting closer or farther away from the club while you are looking for it.

In another embodiment, the system 100 may also integrate with course map data to tell the golfer exactly where they left their club on a specific course. In this way the system may map to specific tee boxes, fairways or greens when looking for lost clubs.

In another embodiment, the system 100 may use a network of phones to keep track of golfers clubs using the internet and either cellular or Wi-Fi data. In this regard, Golfers can link their mobile phone applications together with friends, family or other fellow golfers to increase the range for tracking clubs. When this occurs all the club tracking applications may communicate via the internet (or local network) with the information they are constantly pulling from each club. For example, if golfer 1 is in range of the clubs, but golfer 2 is out of range and golfer 1 and 2 are linked together, the system 100 will communicate the information from golfer 1 to golfer 2. In another embodiment, the system 100 will still alert golfer 2 that they left a club behind, but the tracking information will be more accurate as to where the club is located. It is noted herein that this also works well if someone picks up a golfers clubs but is still near anyone who is linked to your application. System 100 may direct you to a moving club as long as they are near or have passed anyone who is linked to your application. In one embodiment, the more users a golfer links with the wider the tracking they have on their clubs. In another embodiment, if another golfer who is running the application picks up your club you can also send a notification to that golfer that they have your club. In another embodiment, if a golfer picks up a club that has Club Angel they can post a notification to the owner that they have the club.

While the present disclosure has focused on the utilization of system 100 for detecting a lost club, it is recognized that system 100 may be utilized for additional purposes. In one embodiment, the dynamic detection methods and systems of the present invention include, but are not limited to, the tracking and/or analysis of the club swing of a user. Using the system 100, a user may track golf scores (by automatically detecting swing counts), golf swing analytics via the detection unit 102. Further, these features may be used to compare data between users in real or delayed time.

In another embodiment, utilizing the analyzer 110 on each club and the application running on the mobile device 108, the system 100 may distinguish between striking a ball with a club and striking other objects. In one embodiment, the system 100 Club Angel utilizes the analyzer 110 built into each device that is embedded in each club. The system 100 then uses a combination of acceleration, velocity, direction, vibration and shock to determine when a ball is struck.

In another embodiment, the system 100 may keep track of ball hits/strokes utilizing the ball impact technology described above in addition to the ball position measured at each ball impact during game play. In one embodiment, each time a golfer strikes the ball the system 100 records the ball hit, and the strike position using GPS and the date and time of the ball strike. In another embodiment, the system 100 may then keep track of the strokes on each hole (and course). In another embodiment, the system 100 may also plot out the game play on a map of the course for each hole played. In another embodiment, if the system 100 is networked with other golfers then those golfers can see how the other golfers are performing. Golfers can then form "virtual tournaments," where they are playing against other golfers at different course.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device-detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electromagnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although a user is shown/described herein as a single illustrated figure, those skilled in the art will appreciate that the user may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed:

1. A method for detecting a lost golf club comprising:
   detecting an orientation characteristic of a golf club with at least one motion analyzer of a detection unit disposed on a portion of the golf club;
   transmitting the orientation characteristic from the at least one motion analyzer of the detection unit to a mobile communications device;
   determining a distance between the golf club and the mobile communications device based on a signal transmitted from the detection unit to the mobile communications device; and
   determining a lost club state based on the orientation characteristic of the golf club and the distance between the golf club and the mobile communications device.

2. The method of claim 1, further comprising:
   storing a last known position of the golf club.

3. The method of claim 2, further comprising:
   reporting the lost club state and the last known position.

4. The method of claim 2, further comprising:
   reporting the lost club state and the last known position to a display of the mobile communications device.

5. The method of claim 2, further comprising:
   reporting the lost club state and the last known position to a remote server.

6. The method of claim 2, further comprising:
   reporting the lost club state and the last known position to an additional mobile communications device.

7. The method of claim 1, wherein the determining a lost club state based on the orientation characteristic of the golf club and the distance between the golf club and the mobile communications device comprises:
   determining a lost club state by comparing the detected one or more orientation characteristics of the golf club and the distance between the golf club and the mobile communications device to one or more stored configuration profiles.

8. The method of claim 1, wherein the determining a lost club state based on the orientation characteristic of the golf club and the distance between the golf club and the mobile communications device comprises:
   determining the lost club state by comparing the detected one or more orientation characteristics of the golf club to a selected orientation threshold and the distance between the golf club and the mobile communications device to a selected distance threshold.

9. The method of claim 1, wherein the at least one motion analyzer includes:
   at least one of an accelerometer or a compass.

10. The method of claim 1, wherein the detecting an orientation characteristic of a golf club comprises:
    detecting an angle of orientation of the golf club.

11. The method of claim 1, wherein the mobile communications device comprises:
    at least one of a smartphone, personal digital assistant, a tablet device, a table PC, a laptop a smart book or an ultra-book.

12. A method for detecting a lost golf club comprising:
    detecting an orientation characteristic of a golf club with a detection unit;
    transmitting the orientation characteristic from the detection unit to a mobile communications device;
    determining a last known distance between the golf club and the mobile communications device via a signal transmitted from the detection unit to the mobile communications device;
    determining a position of the mobile device via a satellite navigation signal at a time the detection unit and the mobile communications device stop communication;
    determining a distance between the golf club and the mobile communications device based on a combination of the last known distance between the golf club and the mobile communications device and the position of the mobile communications device at the time the detection unit and the mobile communications device stop communication; and
    determining a lost club state based on the orientation characteristic of the golf club and the distance between the golf club and the mobile communications device.

13. The method of claim 12, further comprising:
    storing a last known position of the golf club.

14. The method of claim 13, further comprising:
    reporting the lost club state and the last known position.

15. The method of claim 13, further comprising:
    reporting the lost club state and the last known position to a display of the mobile communications device.

16. The method of claim 13, further comprising:
    reporting the lost club state and the last known position to a remote server.

17. The method of claim 13, further comprising:
    reporting the lost club state and the last known position to an additional mobile communications device.

18. The method of claim 12, wherein the determining a lost club state based on the orientation characteristic of the golf club and the distance between the golf club and the mobile communications device comprises:
    determining a lost club state by comparing the detected one or more orientation characteristics of the golf club and the distance between the golf club and the mobile communications device to one or more stored configuration profiles.

19. The method of claim 12, wherein the determining a lost club state based on the orientation characteristic of the golf club and the distance between the golf club and the mobile communications device comprises:
    determining a lost club state by comparing the detected one or more orientation characteristics of the golf club to a selected orientation threshold and the distance between the golf club and the mobile communications device to a selected distance threshold.

20. A lost golf club detection system comprising:
    a club configuration detection unit including at least one motion analyzer configured to detect one or more orientation characteristics of a golf club, wherein the club configuration detection unit is mechanically coupled to an end region of the golf club,
    wherein the club configuration detection unit includes a communication module communicatively coupled to the club configuration detection unit and configured to transmit one or more detected orientation characteristics from the club configuration detection unit;
    one or more processors of a mobile communications device suitable for executing program instructions stored in a memory medium, wherein the program instructions are configured to cause the one or more processors to receive the detected one or more orientation characteristics of the golf club transmitted by the communication module, the program instructions further configured to cause the one or more processors to determine a lost golf club state based on the orientation characteristic of the golf club and the distance between the golf club and the mobile communications device; and a display unit communicatively couple to the one or more processors and configured to display the determined lost golf club state.

21. The system of claim 20, the memory medium is configured to store a last known position of the golf club.

22. The system of claim 20, wherein the club configuration detection unit is housed in a stopper unit.

23. The system of claim 20, wherein the program instructions are further configured to determine a lost club state based on the orientation characteristic of the golf club and the distance between the golf club and the mobile communications device by comparing the detected one or more orientation characteristics of the golf club and the distance between the golf club and the mobile communications device to one or more stored configuration profiles.

24. The method of claim 20, wherein the program instructions are further configured to determine a lost club state by comparing the detected one or more orientation characteristics of the golf club to a selected orientation threshold and the distance between the golf club and the mobile communications device to a selected distance threshold.

25. The system of claim 20, wherein the at least one motion analyzer includes:
at least one of an accelerometer or a compass.

26. The system of claim 20, wherein the orientation characteristic comprises:
an angle of orientation of the golf club.

27. The system of claim 20, wherein the club configuration detection unit is disposed within at least one of a handle or a grip of the golf club.

28. The system of claim 20, wherein the mobile communications device comprises:
at least one of a smartphone, personal digital assistant, a tablet device, a table PC, a laptop a smart book or an ultra-book.

* * * * *